Nov. 14, 1961     D. SAMIRAN     3,008,736
HIGH PRESSURE FLEXIBLE HOSE COUPLING
Filed Jan. 30, 1957     2 Sheets-Sheet 1

INVENTOR.
DAVID SAMIRAN
BY *Albert L. Jeffers*
ATTORNEY

Nov. 14, 1961 — D. SAMIRAN — 3,008,736
HIGH PRESSURE FLEXIBLE HOSE COUPLING
Filed Jan. 30, 1957 — 2 Sheets-Sheet 2
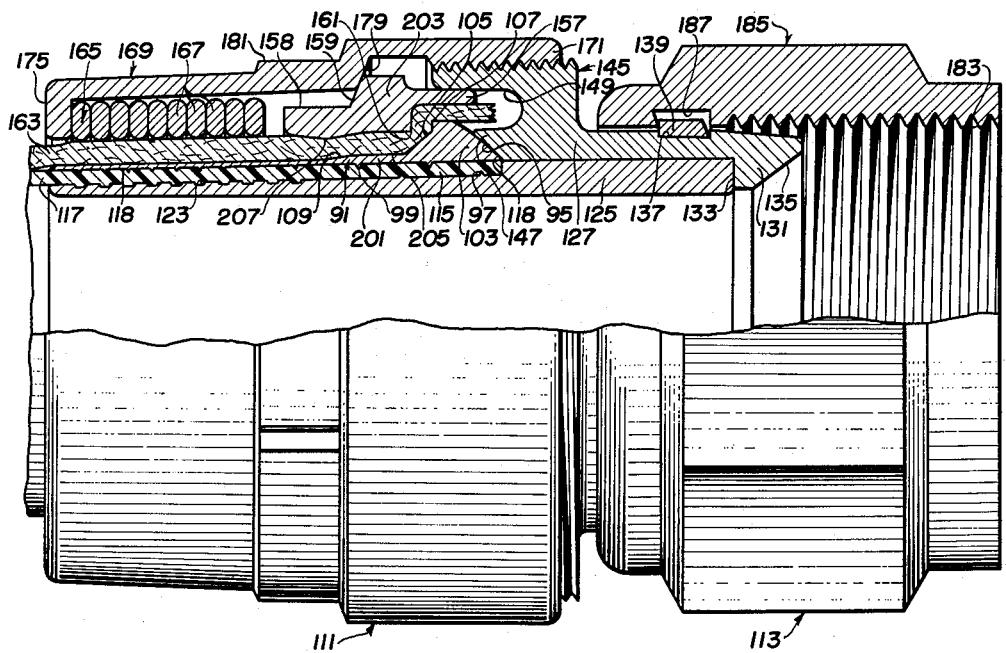
FIG. 2
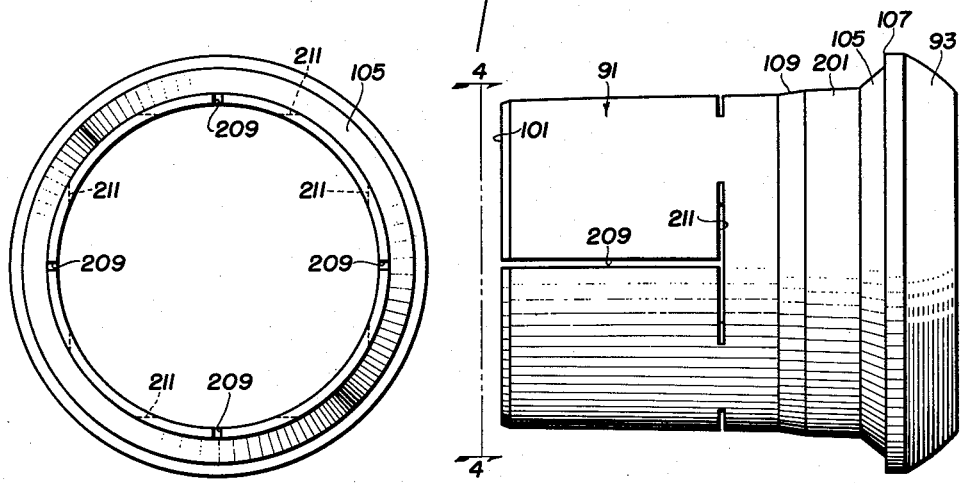
FIG. 4
FIG. 3
INVENTOR.
DAVID SAMIRAN
BY Albert L. Jeffers
ATTORNEY

United States Patent Office 3,008,736
Patented Nov. 14, 1961

3,008,736
HIGH PRESSURE FLEXIBLE HOSE COUPLING
David Samiran, 2126 Fairhill Road, Suite 18,
Cleveland, Ohio
Filed Jan. 30, 1957, Ser. No. 637,103
1 Claim. (Cl. 285—149)

This invention pertains to improvements in hose and couplings or fittings for flexible hose. More particularly, it relates to that type of coupling which is applicable for use with reinforced tubing having at least one braided metallic or similar reinforced tubing or layer therearound required for carrying fluid having high pressure and varying temperature changes such as occur in jet aircraft and missiles.

The principal object of this invention is the provision of a detachable or reusable coupling suitable for use with tubing such as Teflon having a metallic braid reinforcing tube therearound and which, when connected to such tubing, will effect a fluid-tight seal therebetween.

It is known in the art that Teflon tubing has a characteristic tendency to soften or flow when the temperatures around or through the tubing are increased above normal and which characteristic presents a difficult problem in providing a liquid-tight seal between the coupling and tubing. It is an important object of this invention to provide a coupling which will compensate for the above characteristic and will provide a satisfactory liquid-tight seal for several thousand pounds pressure and temperature which will range from a minus 65 degrees centigrade to 400 degrees above centigrade.

Another important object of this invention is the provision of a coupling which will secure the metallic reinforcing braid thereto whereby a safeguard is maintained against the coupling being blown off the tubing when used with several thousand pounds pressure.

A further object of this invention is to provide a coupling having novel means for electrically grounding the metallic reinforcing tube to the coupling.

A still further object of this invention is the provision of a coupling having a connecter provided with means for mounting a male or female swivel nut thereon.

A salient object of this invention is the provision of spring means wherein each coil or ring will function to exert pressure on the tubing.

A further object of this invention is to provide alignment means for positioning the end of the tubing within the coupling.

Another object of this invention is to provide a novel cylindrical sealing gland which is adapted to have a portion constructed so that it may be constricted around the tubing.

With the foregoing objects in view, together with such other objects and advantages as may subsequently appear, the invention resides in the parts and in the combination, construction and arrangements of parts hereinafter described and claimed, and illustrated by way of example in the accompanying drawings, in which:

FIGURE 2 is a side elevation, partly in section, of a modification illustrating a hose end coupling constructed in accordance with the present invention;

FIGURE 3 is a detailed view of the sealing gland;

FIGURE 4 is an end view taken along lines 4—4 in FIGURE 3.

Similar characters of reference designate similar or identical elements and portions throughout the specification and throughout the different views of the drawings.

Figure 1:
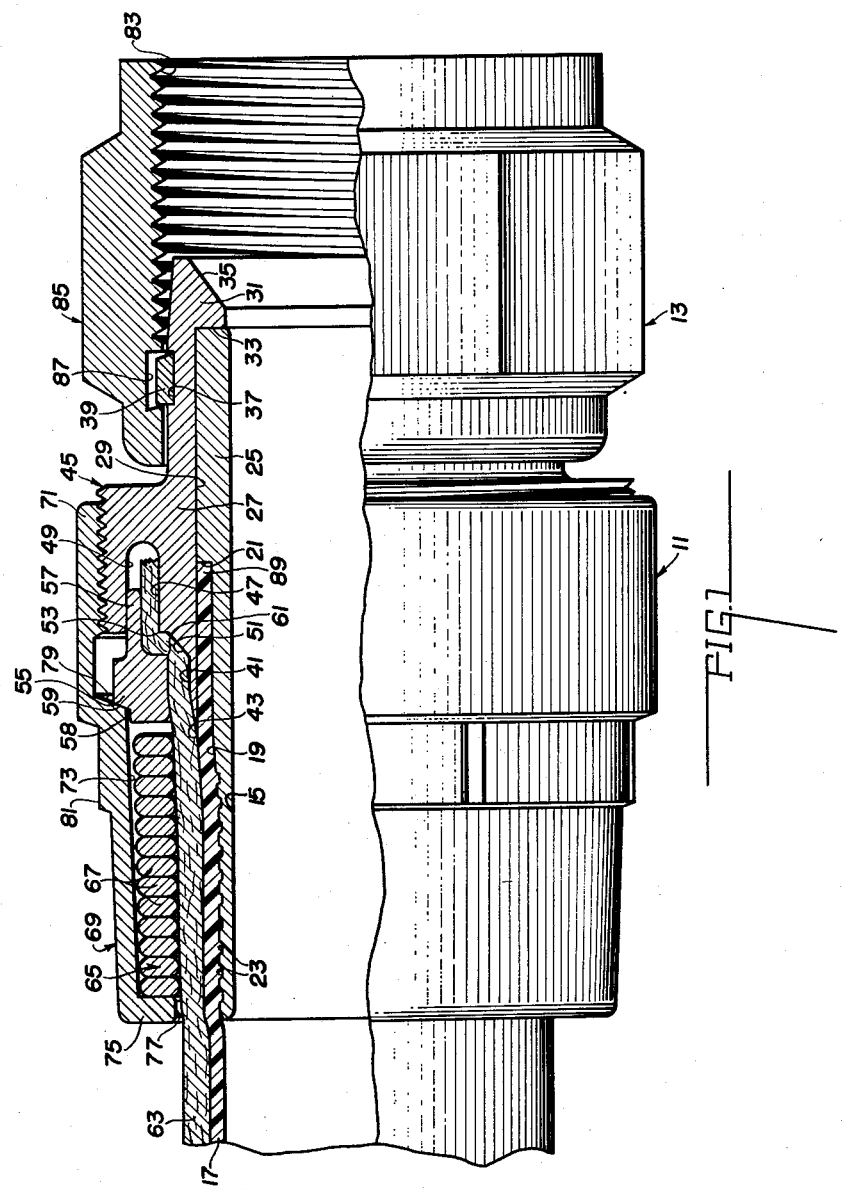
FIGURE 1 is a side elevation, partly in section, showing a hose end coupling constructed in accordance with the present invention.

Referring to FIGURE 1, wherein for the purpose of illustration the high pressure coupling comprises a cylindrical fastening unit 11 and a swivel nut 13. The numeral 15 designates a cylindrical guide member or nipple slightly larger in diameter than the Teflon tubing 17 and having a diverging tapered surface 19 terminating adjacent the forward end of the guide member forming a radial seat 21. The guide member is provided with a number of radial grooves 23 formed on the rearward section for receiving a portion of the Teflon tubing 17 and is provided with an enlarged head portion 25 at the forward end.

In the intermediate portion of the coupling and between the swivel nut 13 and the securing unit 11 is disposed a cylindrical connecter member 27 having a bore 29 which is dimensioned so that a press fit is provided when the connector is mounted on the head portion 25 of the guide member. The forward end of the connecter is provided with an inwardly directed radial flange 31 forming a seat or stop 33 and may be provided with a beveled seat portion 35 to form a metal seal with a corresponding male part (not shown). The connecter is provided with a radial recess 37 for receiving a retaining ring 39. The connector is provided with a cylindrical rearwardly extending projection 41 having the rearward portion tapered to a relatively sharp point 43. A U-shaped portion is provided comprising a cylindrical threaded section or member 45 and a cylindrical section or member 47 in axial alignment and separated from member 45 by a recess 49. An oblique surface or section 51 is disposed between the projection 41 and member 47 forming a tooth or sharp edge 53.

The numeral 55 designates a gripping gland or ferrule having a cylindrical guide member 57 and provided with a radial recess 58 on the rearward portion forming a seat 59. The edge 61 forms a tooth or sharp projection which will assist in anchoring the metallic braid 63.

It is old in the art to apply a spring slightly larger in diameter around the end of a tubing and compressing it to exert pressure on the tubing. It was proven under test that the resulting pressure obtained, as taught by the prior art method, was substantially applied by the end rings of the spring, and the intermediate rings were exerting little or no pressure. An object of this invention is to provide a spring wherein each ring would exert pressure upon the tubing. This object was accomplished by the flat wire spring 65 having an inner diameter slightly smaller than the metallic braid tubing 63 wherein when it is expanded to be mounted on the tubing, each coil or ring 67 will have a constricting or clamping effect to exert pressure on the metallic tubing.

The collar 69 is provided with a threaded portion 71 which is adapted to correspond to the threads 45. The collar is provided with a slightly diverging bore 73 so that a number of the rings 67 will be in contact therewith at the converging end. The collar is provided with an inwardly turned flange 75 forming an opening 77 slightly larger than the wire braid 63 so that the collar may slide readily thereover. An inner wall 79 is adapted to contact the radial seat 59 to move the gland 55 axially when the coupling is being assembled. The collar is provided with conventional wrench flats 81.

The swivel nut is provided with conventional threads 83 and wrench flats 85. The nut is provided with an inner radial recess 87 for receiving a portion of the retaining ring 37.

The preferred method of connecting the coupling to a Teflon tube having a metallic braid reinforcement therearound is to slide the collar 69, spring 65 and gland 55 over the end of the tubing leaving a portion of the tubing extending beyond the gland, which portion is slightly flared by a tool and then inserted with a twisting action upon the guide member 15. When the end of the tubing reaches the sharp edge portion 43, the metallic braid is flared outwardly and into the recess 49, and the Teflon tube enters the recess 89 and abuts the seat 21. The gland or ferrule 55 is then moved axially with the guide member 57 entering the recess 49 whereby the wire braid is crimped between the two sharp points 61 and 53. The spring is then moved axially until it substantially reaches the position illustrated in the drawing, whereby portions of the soft Teflon tubing will be forced into the radial grooves 23 forming a liquid-tight seal. The collar is then threaded on the connecter 45 until the shoulder 79 contacts the seat 59. Thereafter, the collar is forcibly threaded a few degrees to move the gripping gland 55 axially so that the sharp points 61 and 53 will penetrate the metallic braid forming an interlock. It should be noted that the diverging bore 73 permits a number of the rearward rings of the spring to come in contact therewith, whereby a slight compression of the rings is accomplished in addition to the pressure applied by normal constriction of the spring.

An object of the modification illustrated in FIGURE 3, in addition to the objects accomplished by the coupling illustrated in FIGURE 1, is the provision of a sealing gland 91 having a spherical ball 93 adapted to be received in the socket 95, whereby a slight pivotal action is accomplished assisting in the proper alignment of the tubing with the coupling.

The cylindrical guide member or nipple 115 is similar to the guide member 15 with the exception that it is provided with a number of sharp radial spaced teeth or projections 97.

The connecter member 127 is similar to the connecter 27 with the exception that the projection 41 and section 51 are eliminated, and the member 147 is provided with a spherical surface defining a socket 95.

The elongated cylindrical sealing gland 91 is dimensioned so that it may be disposed between the Teflon tubing 117 and the metallic braid 163. The inner surface or bore 118 of the sealing gland is provided with a slight diverging taper and a number of spaced radial projections or teeth 99 extend therefrom. The rearward end of the gland is beveled to form a sharp edge 101, and the forward end is provided with an enlarged head or ball portion 103 having a spherical ball surface 93. The ball is provided with an offset opaque surface 105 forming a tooth or sharp edge 107. The cylinder is tapered at 109 to form a slightly enlarged section 201. The sealing gland is provided with a number of axially spaced recesses 209 terminating in a radial recess 211 forming a weakening portion substantially in the form of a T so that portion of the gland may be slightly constricted or compressed about the Teflon tubing.

The numeral 203 designates a gripping gland or ferrule having a cylindrical guide member 157 and provided with a radial recess 158 on the rearward portion forming a seat 159. The edge 161 forms a tooth or sharp projection which will assist in anchoring the metallic braid 163. A portion of the bore 205 is tapered to provide a hump or cylindrical projection 207.

The spring 165 is similar to the spring 65 with the exception that it may have fewer rings 167.

The collar 169 and swivel nut 185 are similar in construction to the collar 69 and swivel nut 85.

The preferred method of connecting the coupling to a Teflon tubing having a metallic braid reinforcement therearound is to slide the collar 169, spring 165 and gland 203 over the end of the tubing, leaving a portion of the tubing extending beyond the gland. The sealing gland 91 is then inserted between the metallic braid 163 and Teflon tubing 117, as illustrated in the drawing, and then inserted upon the guide member 115 until the ball is seated in the socket 195. The gland or ferrule 203 is then moved axially with the guide member 157 entering the recess 149 whereby the wire braid is crimped between the two sharp points 161 and 107. The spring is then moved axially until it substantially reaches the position illustrated in the drawing, whereby portions of the soft Teflon tubing will be forced into the radial grooves 123, and the radial projections will be depressed into the Teflon tubing forming a liquid-tight seal. The collar is then threaded on the connecter 145 until the shoulder 179 contacts the seat 159. Thereafter, the collar is forcibly threaded a few degrees to move the gripping gland 203 axially so that the sharp points 161 and 107 will penetrate the metallic braid forming an interlock. As the collar is threaded on the connector, the ball and socket will allow a slight pivotal action permitting proper alignment of the tubing with the coupling. An additional crimping action is accomplished between the cylindrical projection 207 and enlarged portion 201.

In view of the foregoing description taken in conjunction with the accompanying drawings, it is believed that a clear understanding of the high pressure coupling will be quite apparent to those skilled in this art, and a more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

I claim:

A reusable coupling for a flexible tube having a metal braid tube surrounding at least a portion of the flexible tube comprising, in combination, a cylindrical guide member having a connector at one end the other end of said member being inserted in the end of said flexible tube, said connector provided with a cylindrical threaded portion, an elongated sealing gland disposed between the end portions of said flexible tube and braid tube, said elongated gland having an enlarged head portion at one end, said head having an offset forming a first sharp projection, a ferrule disposed on the braid tube, said ferrule having a rearwardly facing radial seat and an offset forming a second sharp projection, a spring mounted on the braid tube rearwardly of the ferrule and exerting pressure on the braid tube radially outwardly of the said other end of said cylindrical guide member, a collar having a threaded portion corresponding to the threaded portion on the connecter, said collar having an inner forwardly facing cylindrical shoulder spaced to contact the radial seat of the ferrule for moving the ferrule axially as the collar is threaded on the connector to crimp the braid tube between the first and second sharp projections, said collar provided with an inwardly turned flange on the end forming a recess between said end flange and cylindrical shoulder loosely receiving the spring.

References Cited in the file of this patent

UNITED STATES PATENTS

| | | |
|---|---|---|
| 1,980,389 | Dennie | Nov. 13, 1934 |
| 2,206,672 | Pederquist | July 2, 1940 |
| 2,357,669 | Lake | Sept. 5, 1944 |
| 2,768,845 | Samiran | Oct. 20, 1956 |
| 2,787,289 | Press | Apr. 2, 1957 |
| 2,833,567 | Backer et al. | May 6, 1958 |

FOREIGN PATENTS

| | | |
|---|---|---|
| 806,817 | Germany | June 18, 1951 |
| 520,020 | Belgium | Nov. 16, 1953 |
| 716,797 | Great Britain | Oct. 13, 1954 |
| 718,261 | Great Britain | Nov. 10, 1954 |
| 737,564 | Great Britain | Sept. 28, 1955 |